United States Patent
Pantelidou et al.

(10) Patent No.: US 8,855,693 B2
(45) Date of Patent: Oct. 7, 2014

(54) METHOD AND APPARATUS FOR CONTROLLING WIRELESS DEVICES

(75) Inventors: Anna Pantelidou, Oulu (FI); Sami-Jukka Hakola, Kempele (FI); Timo Koskela, Oulu (FI); Samuli Turtinen, Ii (FI)

(73) Assignee: Broadcom Corporation, Irvine, CA (US)

( * ) Notice: Subject to any disclaimer, the term of this patent is extended or adjusted under 35 U.S.C. 154(b) by 385 days.

(21) Appl. No.: 13/293,396

(22) Filed: Nov. 10, 2011

(65) Prior Publication Data

US 2013/0115992 A1    May 9, 2013

(30) Foreign Application Priority Data

Nov. 7, 2011    (GB) .................................. 1119210.1

(51) Int. Cl.
- *H04B 7/00* (2006.01)
- *H04W 52/02* (2009.01)
- *H04W 74/08* (2009.01)
- *H04W 28/24* (2009.01)

(52) U.S. Cl.
CPC ...... *H04W 52/0235* (2013.01); *H04W 74/0825* (2013.01); *H04W 52/02* (2013.01); *H04W 28/24* (2013.01)
USPC ............................ 455/507; 455/552; 370/412

(58) Field of Classification Search
CPC . H04W 28/24; H04W 52/02; H04W 52/0235; H04W 74/0825; H04W 8/186
See application file for complete search history.

(56) References Cited

U.S. PATENT DOCUMENTS

| | | | |
|---|---|---|---|
| 2005/0249227 A1* | 11/2005 | Wang et al. | 370/412 |
| 2006/0050659 A1 | 3/2006 | Corson et al. | |
| 2006/0111045 A1 | 5/2006 | Orlassino et al. | |
| 2006/0285527 A1 | 12/2006 | Gao et al. | |
| 2007/0281617 A1 | 12/2007 | Meylan et al. | |
| 2008/0062936 A1 | 3/2008 | He et al. | |

(Continued)

FOREIGN PATENT DOCUMENTS

| | | |
|---|---|---|
| EP | 1 865 664 A2 | 12/2007 |
| GB | 2 421 153 A | 6/2006 |

OTHER PUBLICATIONS

IEEE Computer Society, "IEEE Standard for Information technology—Telecommunications and information exchange between systems—Local and metropolitan area networks—Specific requirements, Part 11: Wireless LAN Medium Access Control (MAC) and Physical Layer (PHY) Specifications," IEEE Std 802.11-2007 (Revision of IEEE Std 802.1), Piscataway, NJ, USA, Jun. 12, 2007, pp. C1-C1184, XP017604022.

(Continued)

*Primary Examiner* — Fayyaz Alam
*Assistant Examiner* — Mohammed Rachedine
(74) *Attorney, Agent, or Firm* — Foley & Lardner LLP; Christopher J. McKenna; Daniel E. Rose

(57) ABSTRACT

A wireless device operates in a first mode in which the device can send data to and receive data from an access point. The device receives control data from the access point comprising first data indicative of a time period and second data indicative of a control parameter. The device operates in a second mode for the time period specified by the first data and on the basis of the control parameter. In the second mode, at least some circuitry of the device used for sending data and at least some circuitry of the device used for receiving data is placed in a low power state, and data to be sent to the access point is stored in a buffer of the device. After expiry of the time period, the device operates in the first mode to send the data stored in the buffer to the access point.

17 Claims, 9 Drawing Sheets

(56) References Cited

U.S. PATENT DOCUMENTS

| | | | |
|---|---|---|---|
| 2009/0239568 A1* | 9/2009 | Bertrand et al. | 455/522 |
| 2010/0165963 A1* | 7/2010 | Chu et al. | 370/338 |
| 2011/0059779 A1 | 3/2011 | Thomas et al. | |
| 2011/0243570 A1* | 10/2011 | Kim et al. | 398/140 |

OTHER PUBLICATIONS

PCT Notification of Transmittal of the International Search Report and the Written Opinion of the International Searching Authority, PCT International Search Report and PCT Written Opinion of the International Searching Authority issued in a related PCT Application No. PCT/IB2012/056196 issued by International Bureau mailed Jun. 4, 2013. (18 pages).

UK IPO Combined Search and Examination Report under Section 17 and 18(3) dated Feb. 27, 2012 issued in a related British Application No. GB 1119210.1 (7 pages).

UK IPO Search Report under Section 17(6) dated Feb. 29, 2012 issued in a related British Application No. GB 1119210.1 (4 pages).

\* cited by examiner

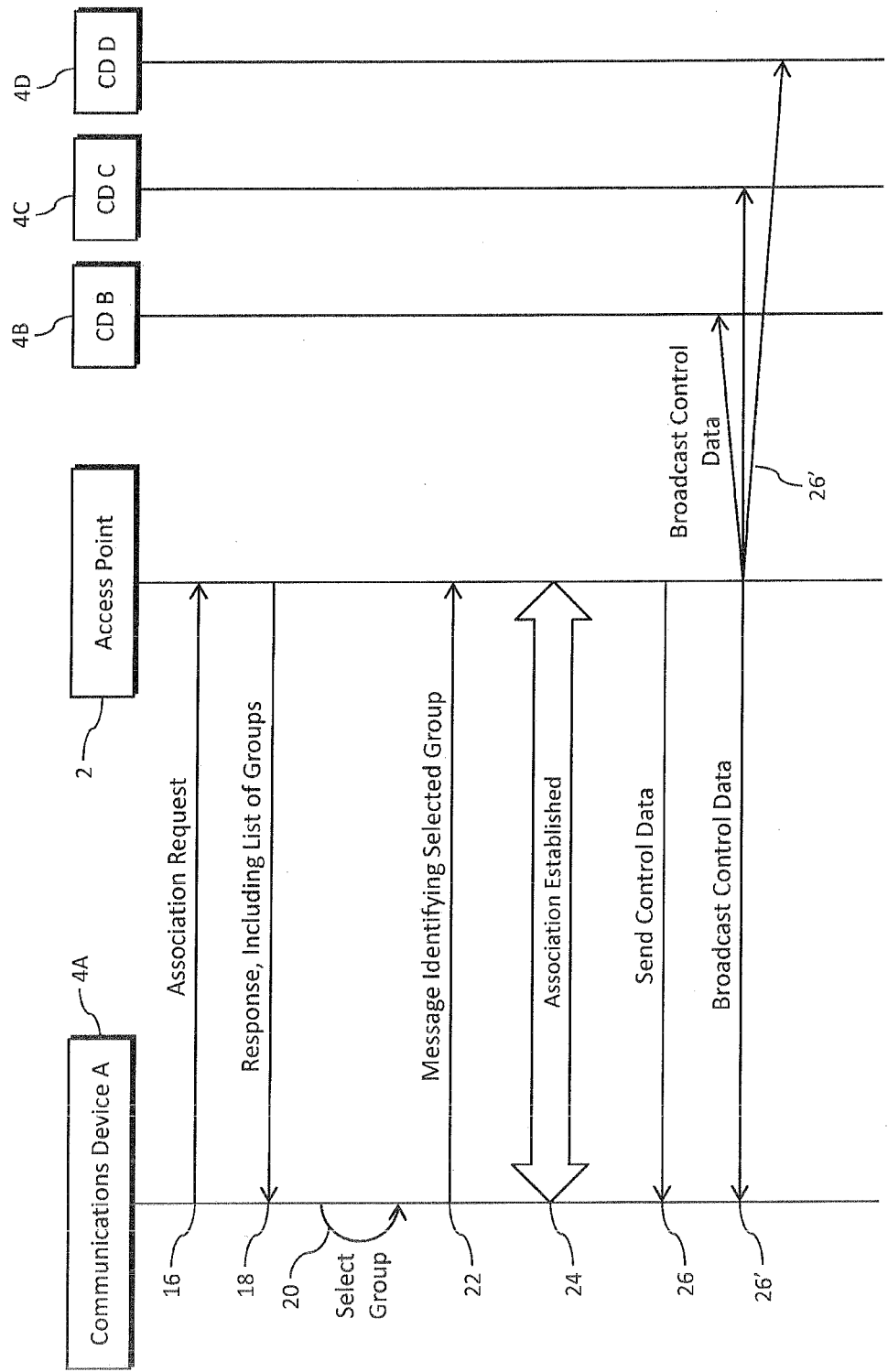
Fig 2
Conventional

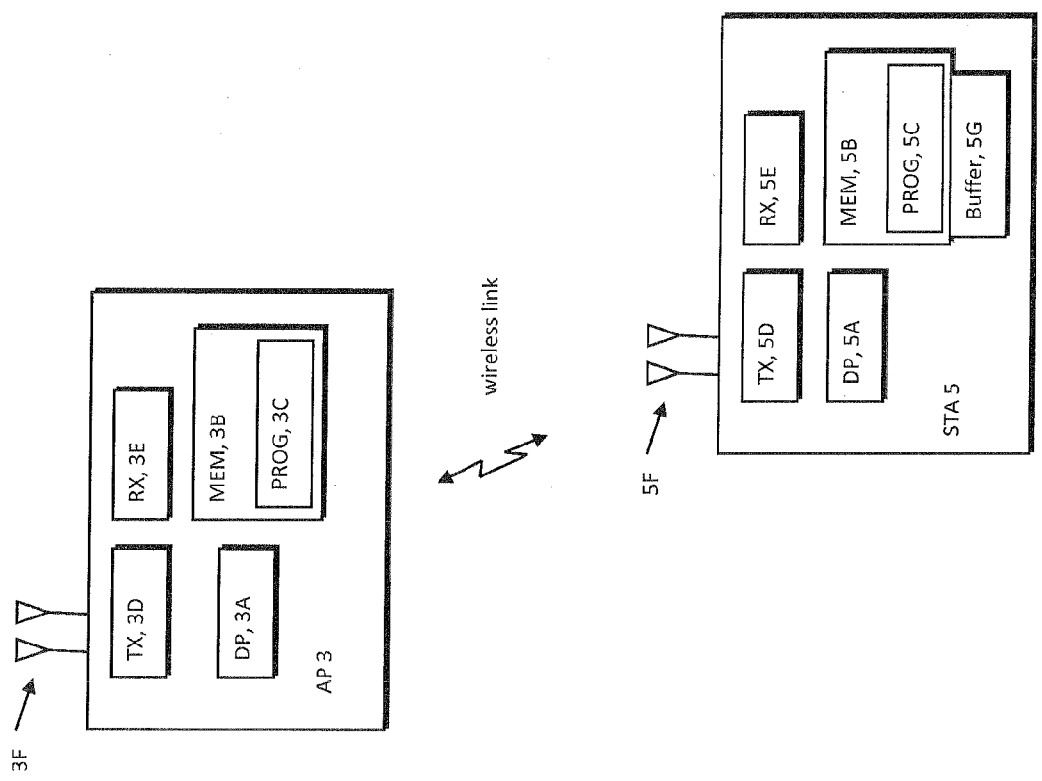

METHOD AND APPARATUS FOR CONTROLLING WIRELESS DEVICES

CROSS-REFERENCE TO RELATED APPLICATION

This application claims the benefit under 35 U.S.C. §119 of UK Patent Application No. 1119210.1 filed on Nov. 7, 2011, the entire disclosure of which is incorporated herein by reference.

FIELD OF THE INVENTION

The present invention relates to systems and methods for controlling wireless devices and in particular to controlling a plurality of wireless devices connected to a wireless access point.

BACKGROUND

Typical wireless networks, such as networks conforming to one of the IEEE 802.11 standards, are arranged such that a plurality of communications devices each has a wireless connection to a central node. The central node is conventionally described as an access point. Typically, all of the communications devices communicate on the same channel (i.e. in the same range of frequency). This sharing of the communications medium may lead to collisions, which is where two or more communications devices attempt to use a channel simultaneously. Consequently, mechanisms are required to avoid collisions.

One known mechanism for dealing with collisions is known as a "Distributed Coordination Function" (DCF). A DCF works by requiring a communications device wishing to transmit to listen on the channel for a particular interval. If the channel is busy (i.e. another communications device is transmitting on the channel) the communications device defers attempting to access the channel for a "back-off period". The back-off period typically has a random element, so that communications devices do not synchronously defer access and then re-attempt access.

However, when there are a large number of communications devices, and in particular when there are a large number of communications devices which transmit at irregular intervals, the known techniques for avoiding collisions are inefficient. Moreover, a communications device can waste a significant amount of energy (i.e. battery life) attempting to communicate on a channel, without actually being able to do so.

Therefore, there is a need for improved mechanisms for arranging access to a communications medium.

SUMMARY OF THE INVENTION

In accordance with at least one embodiment of the invention, methods, devices, systems and software are provided for supporting or implementing functionality for improving access by communications devices to network access points.

A first exemplary embodiment provides a method comprising causing a device to operate in a first mode in which the device is capable of sending data to, and receiving data from, an access point with which the device is in wireless communication. In this embodiment the method comprises receiving control data from the access point, the control data comprising first data indicative of a time period, and second data indicative of a control parameter. The method also comprises causing the device to operate in a second mode for the time period specified by the first data and on the basis of the control parameter, in which, in the second mode, at least some circuitry of the device used for sending data, and at least some circuitry of the device used for receiving data, is placed in a low power state, and data to be sent to the access point is stored in a buffer accessible to the device. The method further comprise, after expiry of the time period, causing the device to operate in the first mode whereby to send the data stored in the buffer to the access point.

A second exemplary embodiment provides an apparatus comprising at least one processor and at least one memory including a computer program code, wherein the at least one memory and the computer program code are configured to, with the at least one processor, cause the apparatus at least to: operate in a first mode in which the apparatus is capable of sending data to, and receiving data from, an access point with which the apparatus is in wireless communication; receive control data from the access point, the control data comprising first data indicative of a time period, and second data indicative of a control parameter; operate in a second mode for the time period specified by the first data and on the basis of the control parameter, in which, in the second mode, at least some circuitry of the apparatus used for sending data, and at least some circuitry of the apparatus used for receiving data, is placed in a low power state, and data to be sent to the access point is stored in a buffer accessible to the apparatus; and after expiry of the time period, operate in the first mode whereby to send the data stored in the buffer to the access point.

This exemplary embodiment may advantageously be implemented in a wireless communications device such as a wireless sensor or wireless user equipment.

A third exemplary embodiment provides a computer program product comprising a non-transitory computer-readable storage medium having a set of computer readable instructions stored thereon, which, when executed by a computing system, cause the computing system at least to: operate in a first mode in which the computing system is capable of sending data to, and receiving data from, an access point with which the computing system is in wireless communication; receive control data from the access point, the control data comprising first data indicative of a time period, and second data indicative of a control parameter; operate in a second mode for the time period specified by the first data and on the basis of the control parameter, in which, in the second mode, at least some circuitry of the computing system used for sending data, and at least some circuitry of the computing system used for receiving data, is placed in a low power state, and data to be sent to the access point is stored in a buffer accessible to the computing system; and after expiry of the time period, operate in the first mode whereby to send the data stored in the buffer to the access point.

A fourth exemplary embodiment provides a method comprising receiving control data at a device from an access point with which the device is in wireless communication, the device having been provided, by the access point, with a first group identifier indicative of the identity of a group of devices with which the device is associated, and at least a part of the control data being associated with the first group identifier and being indicative of at least one operating condition with which devices provided with the first group identifier are configured to operate. In this embodiment the method comprises causing the device to determine that a change of group is desired based, at least in part, on the received control data. The method also comprises causing the device to send a request to the access point for a change of group. The method further comprises receiving a response from the access point indicating whether the request for a change of group has been allowed.

A fifth exemplary embodiment provides an apparatus comprising: at least one processor and at least one memory including a computer program code, wherein the at least one memory and the computer program code are configured to, with the at least one processor, cause the apparatus at least to: receive control data from an access point with which the apparatus is in wireless communication, the apparatus having been provided, by the access point, with a first group identifier indicative of the identity of a group of apparatuses with which the apparatuses is associated, and at least a part of the control data being associated with the first group identifier and being indicative of at least one operating condition with which apparatuses provided with the first group identifier are configured to operate; determine that a change of group is desired based, at least in part, on the received control data; send a request to the access point for a change of group; receive a response from the access point indicating whether the request for a change of group has been allowed.

This exemplary embodiment may advantageously be implemented in a wireless communications device such as a wireless sensor or wireless user equipment.

A sixth exemplary embodiment provides an computer program product comprising a non-transitory computer-readable storage medium having a set of computer readable instructions stored thereon, which, when executed by a computing system, cause the computing system at least to: receive control data from an access point with which the computing system is in wireless communication, the computing system having been provided, by the access point, with a first group identifier indicative of the identity of a group of computing systems with which the computing system is associated, and at least a part of the control data being associated with the first group identifier and being indicative of at least one operating condition with which computing systems provided with the first group identifier are configured to operate; determine that a change of group is desired based, at least in part, on the received control data; send a request to the access point for a change of group; receive a response from the access point indicating whether the request for a change of group has been allowed.

A seventh exemplary embodiment provides a method comprising causing an access point to send control data to a plurality of devices with which the access point is in wireless communication, each of the devices having been provided, by the access point, with one of the plurality of group identifiers indicative of the identity of a group of devices with which the device is associated, the control data comprising a plurality of sets of data, each set of data being associated with a given group identifier and being indicative of at least one operating condition with which the devices associated with the given group identifier are configured to operate. In this embodiment the method comprises receiving, from a said device, a request for a change of group. The method also comprises causing the access point to determine, based on the request, whether a change of group is allowable for the device. The method further comprises causing the access point to send a response to the device, the response indicating whether the request for a change of group has been allowed.

An eighth exemplary embodiment provides an apparatus comprising: at least one processor and at least one memory including a computer program code, wherein the at least one memory and the computer program code are configured to, with the at least one processor, cause the apparatus at least to: send control data to a plurality of devices with which the apparatus is in wireless communication, each of the devices having been provided, by the apparatus, with one of a plurality of group identifiers indicative of the identity of a group of devices with which the device is associated, the control data comprising a plurality of sets of data, each set of data being associated with a given group identifier and being indicative of at least one operating condition with which the devices associated with the given group identifier are configured to operate; receive, from a said device, a request for a change of group; determine, based on the request, whether a change of group is allowable for the device; and send a response to the device, the response indicating whether the request for a change of group has been allowed.

This exemplary embodiment may advantageously be implemented in a wireless access point.

A ninth exemplary embodiment provides a computer program product comprising a non-transitory computer-readable storage medium having a set of computer readable instructions stored thereon, which, when executed by a computing system, cause the computing system at least to: send control data to a plurality of devices with which the computing system is in wireless communication, each of the devices having been provided, by the computing system, with one of a plurality of group identifiers indicative of the identity of a group of devices with which the device is associated, the control data comprising a plurality of sets of data, each set of data being associated with a given group identifier and being indicative of at least one operating condition with which the devices associated with the given group identifier are configured to operate; receive, from a said device, a request for a change of group; determine based on the request, whether a change of group is allowable for the device; and send a response to the device, the response indicating whether the request for a change of group has been allowed.

Further features and advantages of the invention will become apparent from the following description of preferred embodiments of the invention, given by way of example only, which is made with reference to the accompanying drawings.

BRIEF DESCRIPTION OF THE DRAWINGS

FIG. 2 shows a conventional method of associating a communications device with an access point;

FIG. 9 shows schematic diagrams of a communications device and an access point according to embodiments of the invention;

Several parts and components of the invention appear in more than one Figure; for the sake of clarity the same refer-

DETAILED DESCRIPTION OF ILLUSTRATIVE EMBODIMENTS OF THE INVENTION

Exemplary embodiments are concerned with methods and apparatus for use in a wireless communications system in which a plurality of communications devices each has a connection to an access point. Embodiments of the invention are particularly suited to communications systems in which the access point transmits control data, comprising operating conditions in accordance with which the devices are configured to operate, to the communications devices.

Figure 1:
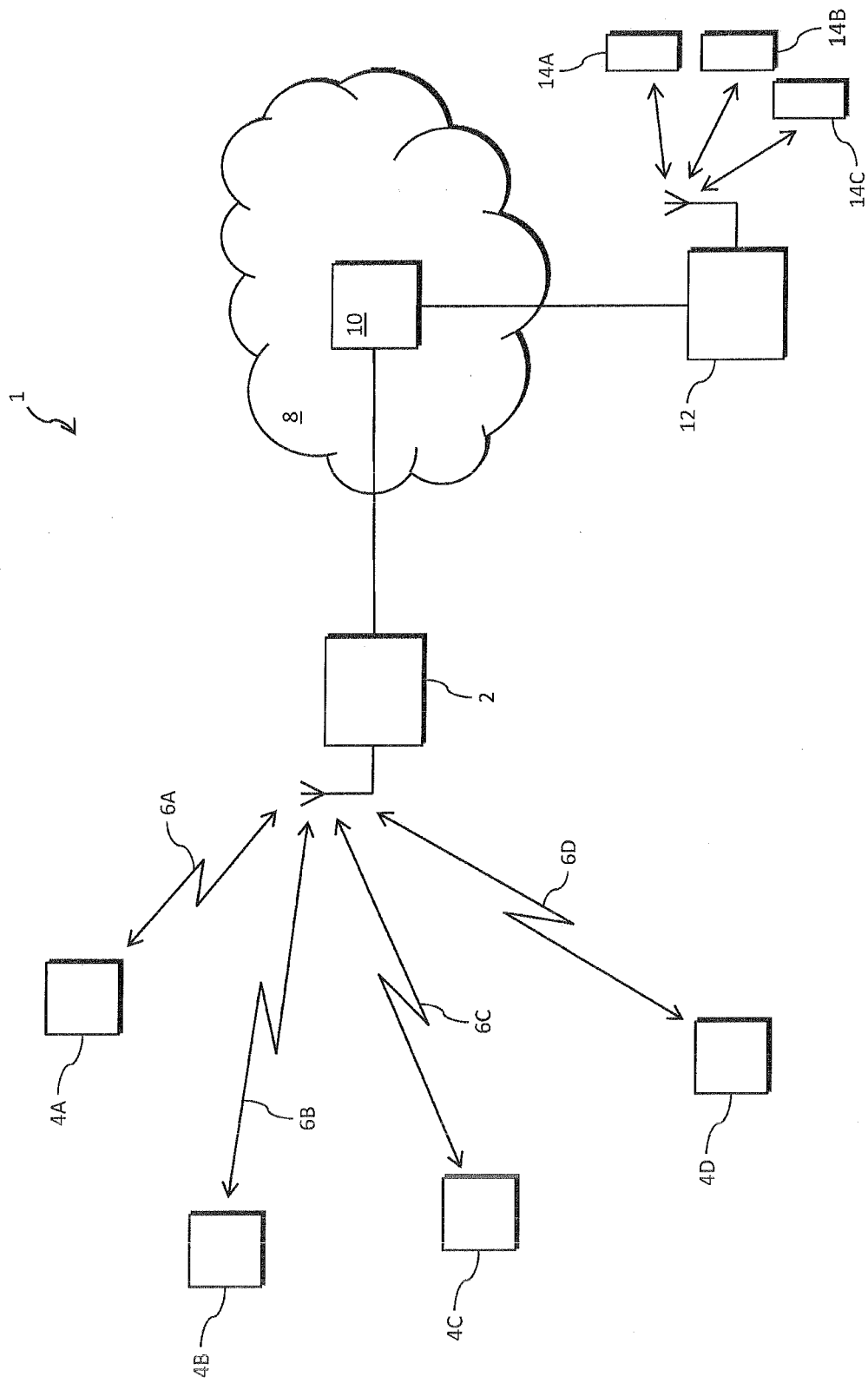
FIG. 1 shows a schematic diagram of a communications network in which embodiments of the invention may be utilised.

FIG. 1 shows an exemplary communications system 1 in which embodiments of the invention may be practiced. Within the communications system 1 is an access point 2, which is wirelessly connected to a plurality of communications devices 4A, 4B, 4C and 4D. Each connection between the access point 2 and the devices 4A, 4B, 4C and 4D is represented by an arrow 6A, 6B, 6C and 6D respectively. Each wireless connection operates over the same channel (i.e. frequency range or frequency band), or set of related (e.g. overlapping or interfering) channels, and as a result, collisions may occur if devices transmit simultaneously.

The access point 2 is connected to a network 8. In this example, the access point 2 is connected to a network node 10 within network 8. Within and/or through network 8 the access point 2 may be connected to other devices, servers and network nodes. For example the network 8 may be taken to represent the internet or a proprietary network. The network node 8 may also be connected to further access points, represented in FIG. 1 (for reference) as access point 12 and devices 14A, 14B and 14C.

It will be apparent that the access point 2 may operate on two or more, different, non-interfering channels. Consequently, the operations of the access point 2 may only be performed in relation to those devices operating on a given channel. Alternatively, the access point may separately perform the methods described below for each given channel and the devices connected over the given channel.

In the exemplary embodiments described below, certain steps are described as being performed by the access point 2. Nevertheless, it will be apparent that some or all of these steps may be performed by a separate entity in the network 8, such as network node 10. Equally, network node 10 may perform such steps for multiple access points, such as both of access points 2 and 12 (in particular if access points operate on overlapping or interfering channels). However, for clarity in the description below, the steps will be described as being performed by the access point 2. In order to wirelessly communicate with the access point 2, and then onwards to other devices accessible via network 8, each communications device 4A, 4B, 4C and 4D associates with the access point 2. For completeness, a conventional association process will now be described with reference to FIG. 2, for one of the communications devices, 4A.

In a first step 16, the communications device 4A sends an association request to the access point 2. In response to the association request 16, the access point 2 sends a response message 18 comprising a list of groups that the communications device 4A may join.

The communications device 4A then, in step 20, selects a group to join, and subsequently, in step 22, sends a message to the access point 2 identifying the selected group. The association between the communications device 4A and the access point 2 is then established, as represented by arrow 24.

It will be apparent that alternative methods of associating the device 4A with an access point 2 may be used. For example, the access point 2 may assign the device to a specific group, without the device being allowed a choice. As such, the response message 18 would identify only the group assigned to the device 4A, and steps 20 and 22 may be omitted. The assigning may be based on, for example, the device's MAC address or the assigned device identity (e.g. the Association Identifier, or AID).

Alternatively or additionally, the device 4A may listen for data being transmitted by the access point 2 and from this listening, the device 4A may identify the groups which may be joined (the transmitted data may correspond to the control data discussed below). As such, the device 4A selects a group prior to sending the association request 16, and identifies the selected group in the association request 16. Therefore the response message 18 may only include a confirmation that the selected group has been joined, and the steps 20 and 22 may be omitted.

Once an association has been established the access point 2 can send control data to the communications device 4A. The transmission of this control data may initially be a one off event as part of the association process (i.e. to provide the data initially to a newly associated communications device). In addition or as an alternative, the control data and updates thereto may be periodically broadcast or multicast (henceforth, these two options will be referred to as broadcasting) as represented by step 26'. By broadcasting the control data, this data will be sent to all connected communications devices (such as devices 4A, 4B, 4C and 4D). The broadcast of data may comprise sending management frames from the access point 2, including sending beacon frames or specific action frames. It will be understood that the above may apply to any instances of broadcasting control data mentioned below.

Exemplary embodiments of the invention provide a mechanism by which this control data is used to control the operation of communications devices 4A . . . 4D that have associated with an access point such as the access point 2. This process will now be described with reference to FIG. 3, which is a logic flow diagram that describes embodiments of the invention in broad terms from the perspective of a communications device such as device 4A.

The device 4A initially operates in a first mode in which the device 4A is capable of sending data to, and receiving data from, the access point 2 (step 28). This data is held in a buffer local to the device 4A. In addition the device 4A may listen in on a communications channel to determine an appropriate point to transmit the data stored in its buffer, or to receive control data from the access point 2. At step 30, the device 4A receives control data from the access point 2, the control data comprising at least first data indicative of a time period ($T_G$), and second data indicative of a control parameter ($Q_G$). Subsequently in step 32 the device 4A is caused to operate in a second mode for the time period specified by the first data ($T_G$) and on the basis of the control parameter ($Q_G$). In the second mode, at least some circuitry of the device used for sending data, and at least some circuitry of the device used for receiving data are placed in a low power state, and data to be sent to the access point 2 is stored in the buffer. In step 34, after the expiry of the time period, the device 4A is caused to revert to operating in the first mode so that the data stored in the buffer may be sent to the access point 2. It will be understood that the data may not be immediately sent, as (as known in the art) the communications device 4A may have to wait for an appropriate time slot. During this waiting period, the device 4A may receive new control data, and may be caused to enter the second mode again, based on such newly received control data.

In sending the control data to the device 4A, the access point 2 is able to control the operation of the device 4A, and in particular to cause the device 4A to stop transmitting, for a specified period of time. This enables more efficient sharing of channels between the various communications devices 4A . . . 4D and the access point 2.

The control parameter forming part of the control data determines whether the device 4A should stop transmitting for a period of time. During the periods in which the device 4A is prevented from transmitting, the device 4A advantageously enters a low power state in which it neither transmits, nor receives (i.e. listens to) traffic on the connection with the access point 2. This provides energy savings in the device 4A which would not be realized if alternative procedures for sharing a communications medium were to be utilized.

Figure 4:
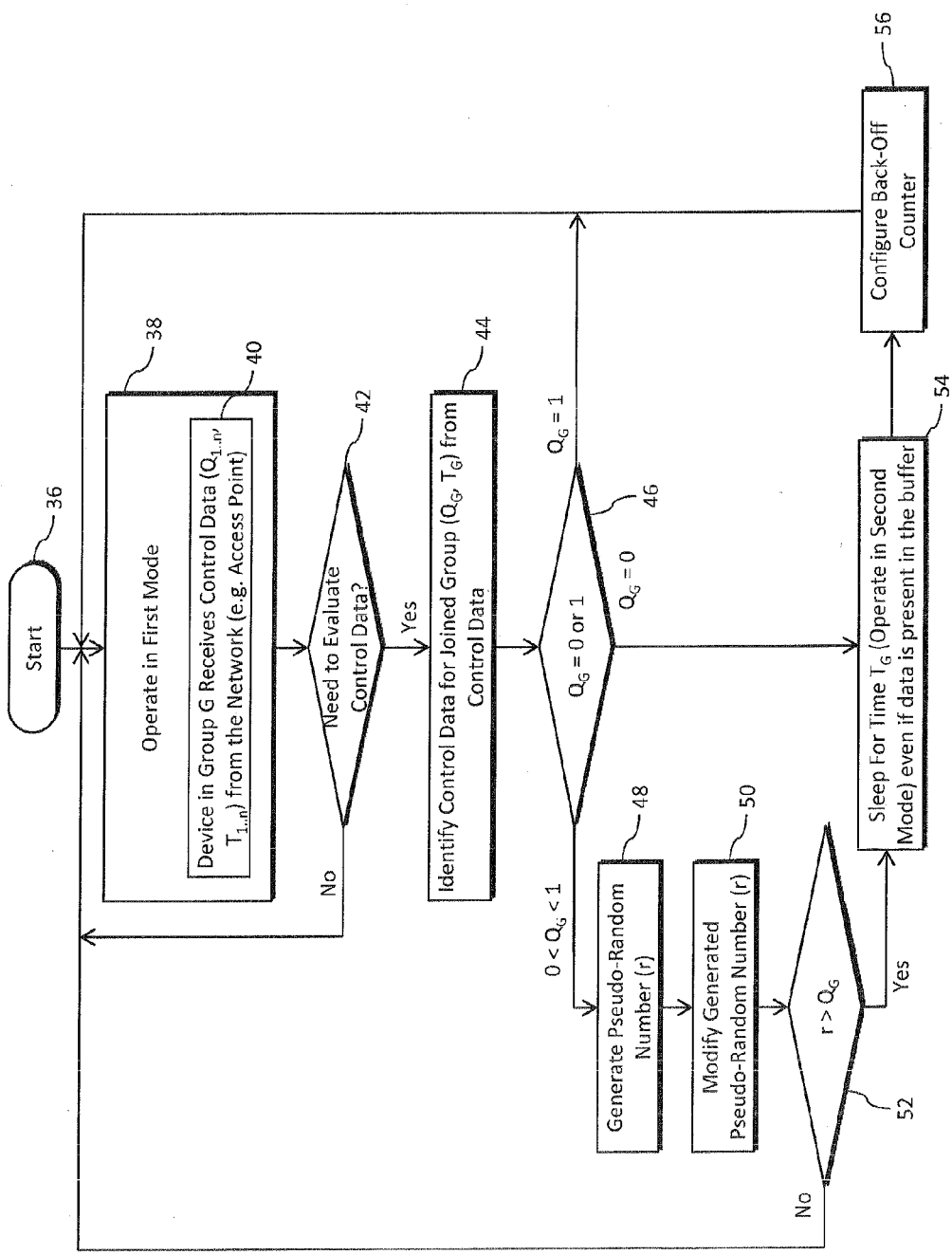
FIG. 4 shows a method of controlling access to a channel according to a further exemplary embodiment of the invention.

In further exemplary embodiments, the control parameter comprises a contention value and the device 4A generates a pseudo-random value, this then being compared to the contention value, in order to determine an operating mode for the device 4A. The control parameter may comprise a contention value in, for example, the range of 0 to 1 (although any other range may be used). Depending on the output of the comparison, the device 4A may continue to operate in the first mode or may enter the second, low-power, mode. By configuring the operating mode of the devices 4A . . . 4D on the basis of a random number and a contention value specified by the access point 2, this enables the access point 2 to provide the same control data to multiple devices 4A . . . 4D, yet results in the devices 4A . . . 4D adopting different operating modes. As a result the communications medium can be more effectively shared between multiple devices 4A . . . 4D. This feature is described in more detail below with reference to FIG. 4.

The operating mode may alternatively be determined in dependence on the contention value being within a range of values of the pseudo-random number. As such the access point 2 may send a contention value which is outside, or at the extreme values of, the range of the pseudo-random numbers generated by the device 4A. For example, if the range of pseudo-random numbers is 0 to 1, the access point 2 may send a contention value of 0 or 1. Such values may be used to force a particular mode upon the device 4A, since the result of the comparison of the pseudo-random number with the contention value is effectively predetermined Advantageously, the device 4A may detect the use of such values, and avoid generating a random number in such circumstances. Instead the device 4A may switch directly to the mode (if required) specified by the control parameter.

The device 4A may further be configured to modify the pseudo-random number based on at least one of: an amount of data stored in the buffer; a proportion of a total buffer size filled with data; priority data associated with the data to be sent to the access point 2; and the energy available to the device (such as remaining battery capacity). In this way the amount of data to be transmitted from a given device 4A additionally has an influence on whether or not any given device 4A adopts one operating mode or another. This assists with preventing any device 4A having a buffer overrun or the like. These features are described in more detail below with reference to FIG. 4.

In some exemplary embodiments the control data is received as a broadcast communication from the access point 2. In some exemplary embodiments the control data is received as a multicast communication from the access point 2. As such the access point 2 may transmit the control data as part of a routine broadcast or multicast signal such as a beacon signal, thereby enabling the control data to be easily distributed without large network overheads. This feature is described in more detail below with reference to FIG. 4.

In further exemplary embodiments, the device 4A may be caused to execute a distributed coordination function having a so-called back-off counter while in the first mode. The time period ($T_G$) specified in the first data received from the access point 2 may be used to configure the back-off counter with a duration when the device 4A is in the second mode. Alternatively, the back-off counter may be reset when the device 4A transitions from the second mode to the first mode.

When the device 4A operates a distributed coordination function having such a back-off counter, then if there is a collision or potential collision between transmissions from the device 4A and another device, the device 4A will not transmit again for a duration equal to the back-off period. If, during the back-off period, the device 4A receives modified control data (i.e. a change in the second data provided by the access point 2), the back-off counter may be paused for the duration of the time period specified by the access point 2, and be restarted at the end of the specified time period. Alternatively, the counter may be reset at the end of the time period; this latter option may be preferred if the counter were to reach zero during the time period. In one arrangement, the hack-off counter may be configured on the basis of a random element to avoid scenarios in which several devices 4A . . . 4D are configured with the same back-off period. These features are described in more detail below with reference to FIG. 4.

In some embodiments, the device 4A may operate in accordance with the IEEE 802.11 standard, and preferably the IEEE 802.11 ah standard. In other embodiments, the device 4A may be configured for communications according to other standards such as the IEEE 802.15.4 standard Further features of exemplary embodiments for providing a mechanism by which the control data is used to control the operation of the communications devices 4A . . . 4D will now be described with reference to FIG. 4, which is a flow diagram showing steps performed by a communications device 4A having associated with the access point 2 in the manner described above with reference to FIG. 2 ("Start", step 36).

Steps 38 and 40 show the communications device 4A initially operating in the first mode and receiving control data from the network (i.e. from the access point) 2, as has already been described above with reference to steps 28 and 30 of FIG. 3.

When operating in the first mode, the device 4A periodically determines whether the control data should be evaluated, as represented by block 42. The need to evaluate the control data may arise for a number of reasons. For example, the device 4A may have data in its buffer which needs to be transmitted; the device 4A may have received new or updated control data; the device 4A may be configured to evaluate the control data on a regular basis, irrespective of whether there is data in the buffer to send. The device 4A may evaluate the control data during the transmission of data based on, for example, receiving new control data from the access point 2, and this may result in the interruption of the transmission, with the data being stored in the buffer until the device 4A returns to the first mode.

If there is no need to evaluate the control data, the device 4A continues to operate in the first mode, as represented by the return to step 38. However, if it is determined that the device 4A needs to evaluate the control data, the device 4A performs the action indicated by step 44.

In step 44, the device 4A identifies the control data specific to the device 4A. The control data may, as such, be divided into sets of data, each associated with a different identifier. The identifier may be a group identifier associated with the group that the device 4A joined with the device 4A set up the connection with the access point 2 (as described above with reference to FIG. 2). In this example, the control data, as a whole, is represented $Q_{1...N}$ and $T_{1...N}$, where the subscript 1 . . . N represents that there is a Q and a T value for each group. For the purposes of illustration, the group that the device 4A has joined will be taken to be group 'G', and as such the control data identified in this set is $Q_G$ and $T_G$.

In this exemplary embodiment, the value $Q_G$ represents a contention value. That is a value indicative of the number of devices in the group and of the amount of the network resources available to the group, with a lower value indicating that there are fewer resources and/or a higher number of devices, and therefore the probability of the device 4A being able to transmit data is low. $Q_G$ may take any value in the range of 0 to 1.

In step 46, the device 4A determines whether the value $Q_G$ is equal to 0 or 1. If $Q_G$ takes either of these values, then the operation of the device 4A is explicitly controlled by the control data, and therefore certain steps do not need to be performed. If $Q_G$ has the value of 1, then the device 4A continues to operate in the first mode, as represented by the return to step 38. In the alternative, if $Q_G$ has the value of 0, then the device 4A performs the action indicated by step 54, which is described below.

If, however, $Q_G$ has a value between 0 and 1, the device 4A generates a pseudo-random number, r. This number may optionally be modified by the device 4A, in step 50, based on e.g. an amount of data stored in the buffer; a proportion of a total buffer size filled with data; and/or priority data associated with the data to be sent to the access point 2. This enables the device 4A to modify its behaviour based on conditions specific to the device 4A. For example, if the buffer is almost full, then the device 4A may lower the pseudo-random number to increase the probably of being allowed to remain in the first mode. In some embodiments, the device 4A may modify the distribution of the pseudo-random number, from e.g. a uniform distribution to a non-uniform distribution (i.e. one weighted at one end); alternatively, the range of the pseudo-random number may be changed from e.g. the interval 0 to 1 to the interval 0 to 0.5. In As an alternative, the device 4A may directly modify the value $Q_G$.

In step 52, the pseudo-random number is compared to $Q_G$ to determine the operating mode of the device 4A. If r is greater than $Q_G$ then the device 4A will enter the second mode as represented by step 54. However if r is not greater than $Q_G$ (i.e. r is less than or equal to $Q_G$) the device 4A will remain in the first mode, as represented by the return to step 38.

In the second mode (step 54) the device 4A neither transmits nor receives data, and therefore enters a low power state or sleep mode. In this sleep mode, some of the circuitry of the device 4A, and in particular the circuitry associated with sending and/or receiving data may be put into an appropriate low power state. Accordingly the device 4A stores any unsent data in the buffer, and may also receive (from e.g. a sensor connected to the device 4A) new data to be transmitted, this new data being stored in the buffer. The second, or sleep, mode lasts for a time $T_G$, that is, the device 4A sleeps for the period specified in the control data. $T_G$ may be a value representing the sleep time in an appropriate unit such as seconds or milliseconds.

After expiry of the time period $T_G$, in step 56, the back-off counter of the device 4A is configured to take into account of the fact that the device 4A has been in the low power mode. There are a number of options for configuring the back-off counter. In one arrangement the back-off counter may be reset; that is the device 4A may immediately revert to the first mode and transmit data, as indicated by the return to step 38. Alternatively, the back-off counter may be effectively paused for the time period $T_G$ during which the device 4A was in the second mode. As such, and assuming the back-off counter was running while the device 4A was in the second mode, the back-off counter may be increased by an amount equal to the time period $T_G$. In another alternative, and assuming the back-off counter was paused during the period for the second mode, the back-off counter may be decreased by an amount equal to the time-period $T_G$.

In some embodiments, the device 4A may determine that it is to operate in the second mode for a period of time, during which new or updated control data may be transmitted. As such, the device 4A may delay entering the second mode until the new control data is received, or may appropriately modify the time period for which the device 4A enters the second mode such that the device 4A returns to operating in the first mode for the period in which the control data is transmitted. The device 4A may then re-enter the second mode of operation, for the remainder of the time period.

The foregoing embodiments assume that the device 4A remains part of the group with which it initially associated in step 24 of FIG. 2. In other embodiments, the device 4A may trigger a change to the group to which it belongs. This may be beneficial in situations in which, for example, the device's buffer is approaching its maximum size, and the device 4A may therefore trigger a change of group in order to empty its buffer and improve its transmission rate.

A process by which the device 4A triggers a change of group will now be described with reference to FIG. 5, which is a logic flow diagram which describes embodiments of the invention in broad terms from the perspective of device 4A. In this embodiment the device 4A will be assumed to have already established a connection with access point 2 and as such, is already associated with a group. Therefore, the device 4A will have been provided with a group identifier of the group with which it is associated.

At step 58, the device 4A receives control data from the access point 2. As for the embodiments described above, at least a part of the control data is associated with specific group identifiers, and is therefore indicative of at least one operating condition with which the devices are configured to operate, on a per group basis. In step 60, the device 4A determines whether a change of group is desired based, at least in part, on the control data for the group with which it is currently associated. If a change of group is desired, then in step 62 the device 4A sends a request for a change of group to the access point 2. Having sent the request, in step 64 the device 4A will receive a response from the access point 2 indicating whether the request for a change of group has been allowed.

This mechanism is advantageous in that it provides a means for the device 4A to dynamically migrate to a different group as the makeup of the various groups changes, and/or the requirements of the specific device 4A change. For example, a group with which the device 4A is currently associated might become unsuitable in the event that the associated control data does not give individual members of the group sufficient resources with which to transmit data stored in their device buffers.

As described above, the access point 2 may broadcast the control data such that it is received by all devices, irrespective of their group associations. The device 4A may identify, from the control data, at least one operating condition which is more efficient for the device 4A than that associated with its current group. As such, the device 4A may listen in on the control data being sent to the other groups of devices e.g. as a beacon message. The device 4A may determine from the control data whether other groups would be more efficient for the device 4A, for example on the basis of number of members of a group, or the time period to wait in the second mode. The device 4A may thereafter send a request for a change of group, the request specifying a group identifier corresponding to a preferred operating condition.

In the event that the device 4A identifies a plurality of such alternative groups, the device 4A may determine a priority order within the alternative groups, such that the request for a change of group identifies individual groups with a priority. Therefore, the device 4A may identify not only those groups which are more desired than the device's current group, but also be able to be preferentially joined to the most desired group. These features are described in more detail below with reference to FIG. 6.

In some exemplary embodiments, the request for a change of group identifies at least one communications requirement of the device 4A. This requirement may comprise at least one of: a quality of service requirement; a traffic rate requirement; and a latency requirement. Therefore, in these embodiments, the device 4A does not select a group, but rather sends a request to the access point 2 where the request contains preferences of the device 4A. The access point 2 may then select an appropriate group based on device preferences. In all the above cases it will be understood that the access point 2 may reject a request if there are no suitable groups. This enables the access point 2, which will have more information on the communications conditions (i.e. the number of devices, and the traffic being received from these device), to arbitrate on the change of group, while ensuring that the preferences of the communications device 4A are met. These features are described in more detail below with reference to FIG. 6.

Figure 6:
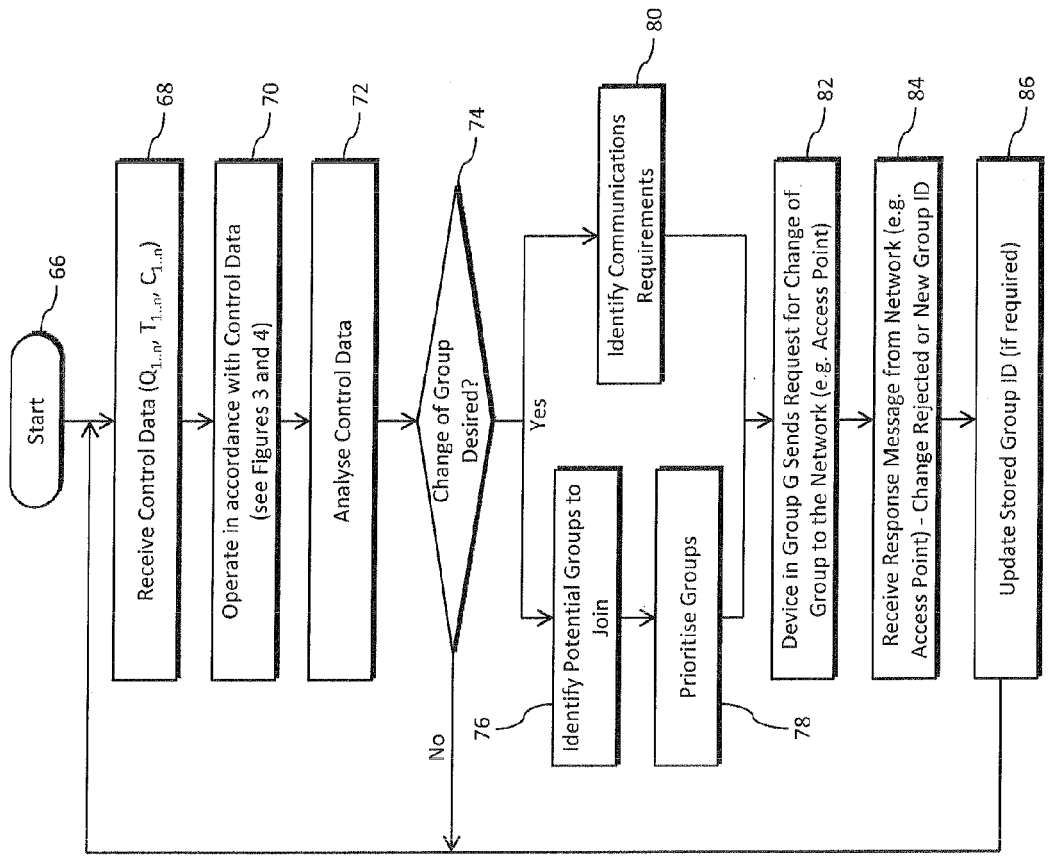
FIG. 6 shows a method of changing group according to a further exemplary embodiment of the invention.

Further features of exemplary embodiments for providing a mechanism for the communications devices 4A . . . 4D to change group will now be described with reference to FIG. 6, which is a flow diagram showing steps performed by a communications device 4A having associated with the access point 2 in the manner described above with reference to FIG. 2 ("Start", step 66).

In step 68, the device 4A receives the control data from the access point 2. As described above, the control data may contain contention values ($Q_{1...N}$) and time periods ($T_{1...N}$) for each of the groups. The control data may contain additional information such as the number of devices in each group ($C_{1...N}$) and other information relating to the nature and condition of the groups.

Having received the control data, in step 70, the device 4A operates in accordance with the control data, which may be as described above with reference to FIGS. 3 and 4. This may include the steps of identifying a set of data associated with the group with which the device 4A is associated and causing the device 4A to operate in compliance with the at least one operating condition indicated by the identified set. The device 4A may thereafter operate in the first or second mode as described above.

In step 72, the device 4A may analyse the control data and data relating to the device (such as the amount of data in the buffer) and, in step 74, based on the analysis, determine if a change of group is required. This analysis may be triggered by any one of a number of events, such as a periodic trigger, or when the device 4A determines that it is getting insufficient resources to properly operate, for example by having been prevented from transmitting data for a long period (i.e. the data in the buffer may be determined to be older than a certain predetermined value). Other possibilities include: whether the device's buffer is approaching its maximum size, in which case the device 4A may trigger a change of group in order to empty its buffer and improve its transmission rate; and whether the device 4A determines that its overall traffic rate is, or will be, changing. Overall, the device 4A will trigger a change of group if it appears that an alternative group would be more efficient.

If a change of group is not desired, the device 4A will return to step 68. However, if it is determined that a change of group is desired, one of two different processes may be performed.

In a first process (step 76) the device 4A identifies potential groups to join. This may involve determining whether other groups have fewer members from e.g. the data specifying the number of devices in each group ($C_{1...N}$). The device 4A may also determine whether other groups are receiving contention values ($Q_{1...N}$) that would make transmissions from the device 4A more efficient. The device 4A may also determine whether other groups are receiving time periods ($T_{1...N}$) that are shorter than that associated with the group to which the device 4A has joined.

In the event that a plurality of such groups is identified, in step 78 the device 4A may determine a priority order for the identified groups.

The device 4A then sends a request to the access point 2 for a change of group (step 82), identifying the group(s) and optionally the priority of each group as identified in step 78.

In a second process (step 80), which may be performed in addition to, or as an alternative to the first process, the device 4A may, in step 80, identify at least one communications requirement of the device 4A. The at least one communications requirement may comprise at least one of: a quality of service requirement; a traffic rate requirement; and a latency requirement. If this process is followed, then the request for a change of group, sent in step 82, will contain an indication of the requirements identified in step 80.

Irrespective of which process is followed, in step 82 the request for a change of group is sent to the access point 2. The access point 2 analyses the request, in a manner described in more detail below, and thereafter the device 4A receives a response from the access point 2 (step 84). This response will indicate whether or not a change of group is allowable, and, if a change is allowable, the identifier of the new group to which the device 4A can join.

In step 86 the device 4A may update a record of the group to which it is joined (if required), and subsequently returns to step 68, in which the device 4A receives control data and operates in accordance with the control data for the new group.

In order to enable the afore-mentioned mechanism for the communications devices 4A . . . 4D to change group, the access point 2 is configured to perform certain cooperating processes. These processes will now be described, firstly with reference to FIG. 7, which is a logic flow diagram describing embodiments of the invention in broad terms from the perspective of the access point 2. In this embodiment the access point 2 will be assumed to have already established a connection with a plurality of communications devices (for example, devices 4A . . . 4D). Moreover, the access point 2 will have provided each of the devices 4A . . . 4D with a one of a plurality of group identifiers, each group identifier being indicative of the identity of a group of devices with which a device is associated.

In step 88, the access point 2 sends control data to the devices 4A . . . 4D, the control data comprising a plurality of sets of data, each set being associated with a given group identifier and being indicative of at least one operating condition with which the devices 4A . . . 4D provided with the given group identifier are configured to operate. The composition of this control data may be as described above, namely a time period and a contention value. In step 90, the access point 2 receives, from a first of the communications devices 4A, a request for a change of group. Then, in step 92, the access point 2 determines whether the change of group is allowable for the first device 4A. Finally, in step 94, the access point 2 sends a response to the first device 4A, the response indicating whether the request for a change of group has been allowed.

By providing a mechanism to receive requests from devices for a change of group, and being able to signal to the devices whether the requests are determined to be allowable, the access point 2 can more efficiently utilise the wireless communications medium i.e. frequency range/channels.

Figure 7:
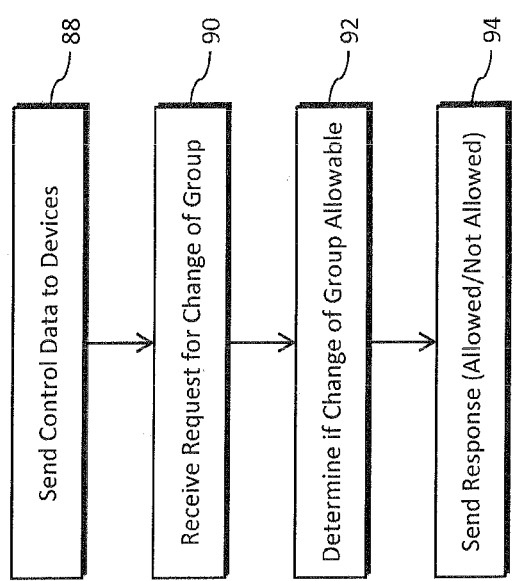
FIG. 7 shows a method of allowing a change of group according to an exemplary embodiment of the invention.
Figure 8:
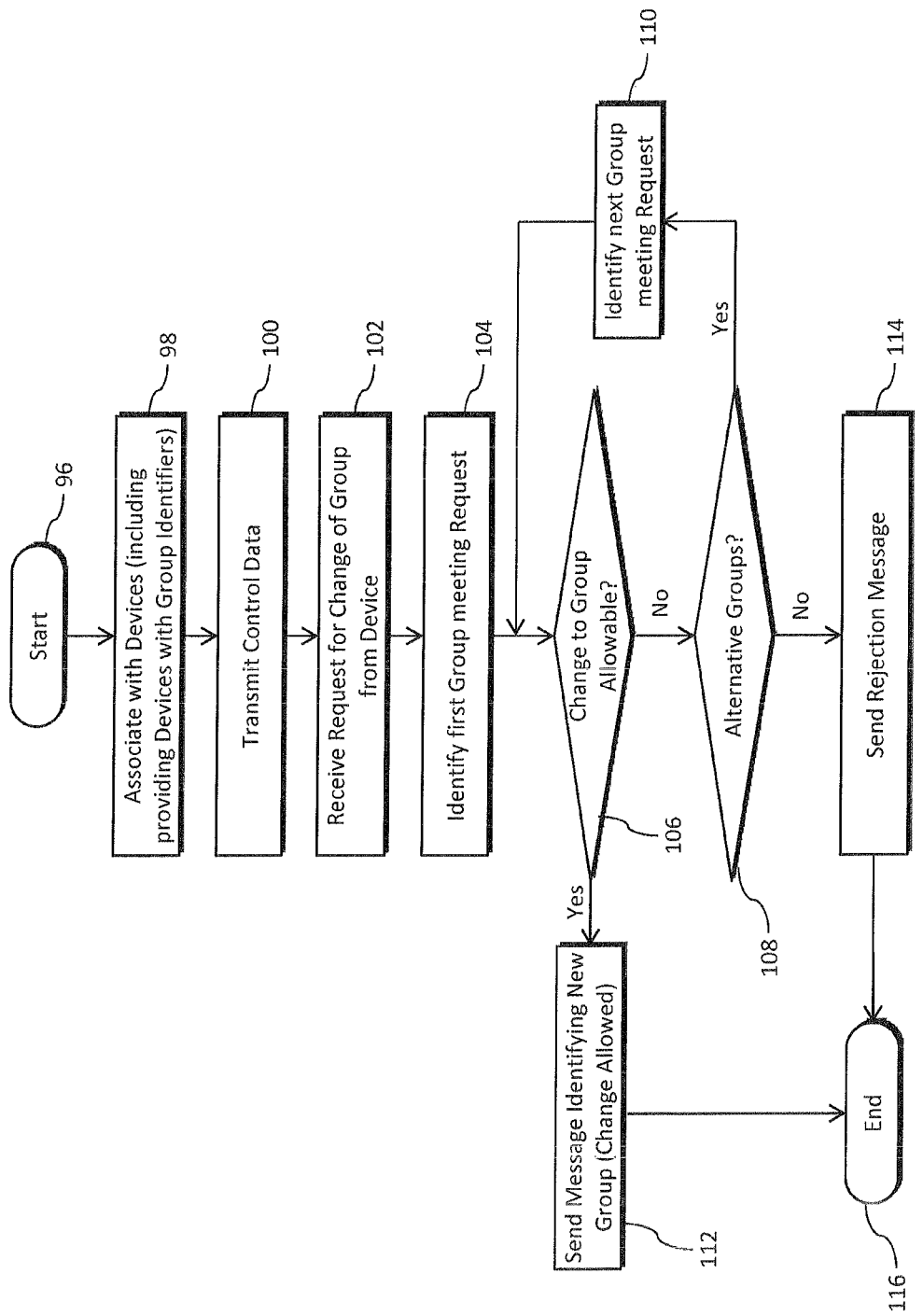
FIG. 8 shows a method of allowing a change of group according to a further exemplary embodiment of the invention.

Turning now to FIG. 8, further features of the access point 2, when configured in accordance with this embodiment, will now be described. For completeness this Figure shows an initialization step, step 98, in which the access point 2 coordinates the initial joining of individual devices 4A ... 4D to one or more groups, and therefore involves the access point 2 sending a group identifier to each of the communications devices 4A ... 4D. Step 100 mirrors step 88 of FIG. 7 in that it corresponds to the access point 2 transmitting, to the devices 4A ... 4D, control data.

In step 102, the access point 2 receives a request for a change of group from a device 4A. This request may identify one or more groups, and optionally may specify a priority for each of the identified groups. Alternatively, the request may identify at least one communications requirement of the device 4A, this comprising at least one of: a quality of service requirement; a traffic rate requirement; and a latency requirement.

In steps 104, 106, 108 and 110 the access point 2 will evaluate the group change request, and determine if the request is allowable. This includes identifying a first group meeting the request in step 104, determining if a change to that group is allowable in step 106, if a change is not allowable, determining if there are alternative groups meeting the request in step 108 and identifying such a group in step 110. The process then returns to step 106 where it is determined if a change to the group identified in step 110 is allowable. The process repeats until there are no alternative groups, or a group to which a change is allowable is identified.

In performing these steps, the access point 2 may determine if a change to the group specified in the request received at step 102 is allowable, and in the order defined by priority indications provided in the request. Alternatively, if the request identifies the communications requirements of the device 4A, then the identifying of the groups may involve identifying each group which meets the communications requirement(s) specified in the request.

In some embodiments, the access point 2 may take into account its own communications requirements or prioritization of channels. This may be used to modify the order in which the channels are evaluated to determine if a change is possible.

If a change to an identified group is allowable, then the access point 2 sends a message to the communications device identifying the new group in step 112. Additional information may also be provided to the access point 2 in this message. Alternatively, if no allowable group has been found, then in step 114, a rejection message is sent to the device, indicating that the change request has been rejected.

In some embodiments the access point 2 may provide additional information in the control data. For example, the access point 2 may determine that there is data to be sent from the access point to a device (for example device 4A), but that the group to which device 4A belongs is to be provided with a contention value of zero of close to zero, such that the device will, or is highly likely to, enter the low power state and therefore be unable to receive the data. The access point may therefore modify the control data, or may send a specific signal to the device 4A, to inform the device 4A not to operate in the second mode (i.e. the low power sleep mode), so that data can be sent to the device. The access point may modify the control data to have a specific portion that identifies certain devices, and, for example, sets a flag indicating that these devices should not operate in accordance with the control data associated with that device's group.

It is also possible for the access point 2 to modify the groups by, for example, removing or adding new groups. The access point 2 may consequently change the control data to reflect the change in the number of groups. Devices (4A ... 4D) may detect the change in the control data (in accordance with methods described above) and make a request to change group accordingly. This may include requesting to join a newly created group, or, in the case that the group which the device had previously joined no longer exists, to join an existing group. In this latter scenario, it will be apparent that the access point may force devices to change group by removing the group to which they are joined.

Figure 3:
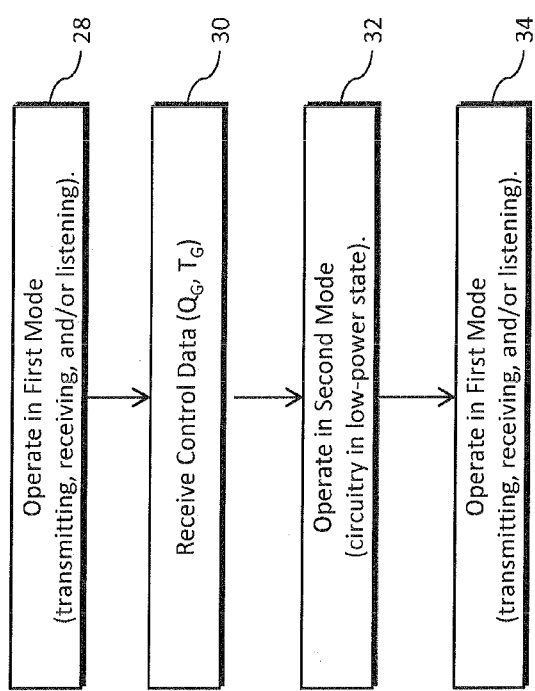
FIG. 3 shows a method of controlling access to a channel according to an exemplary embodiment of the invention.

FIG. 3, described above, represents steps executed by a computer program or an implementing algorithm stored in the local memory of the device 4A, as well as illustrating the operation of a method and a specific manner in which a processor and memory with computer program/algorithm are configured to cause that device 4A (or one or more components thereof) to operate. The various blocks shown in FIG. 3 may also be considered as a plurality of coupled logic circuit elements constructed to carry out the associated function(s), or specific result or function of strings of computer program code stored in a computer readable memory.

Figure 5:
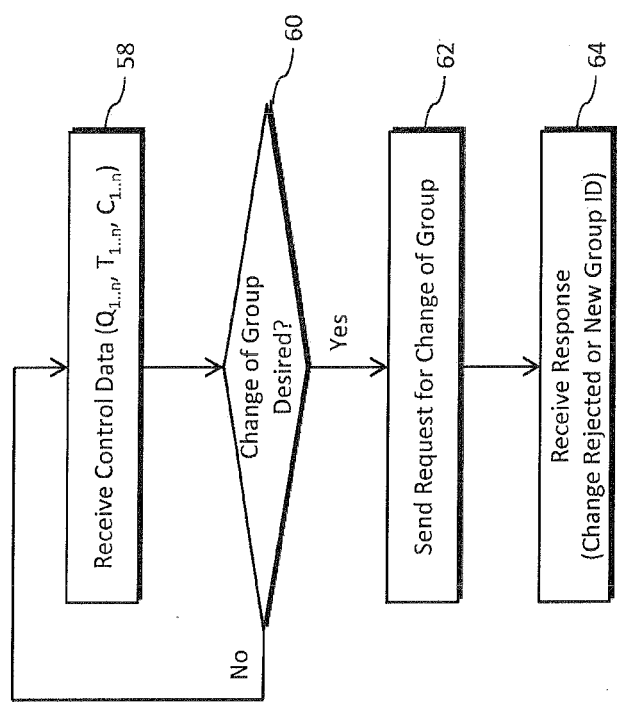
FIG. 5 shows a method of changing group according to an exemplary embodiment of the invention.

FIG. 5, described above, represents steps executed by a computer program or an implementing algorithm stored in the local memory of the device 4A, as well as illustrating the operation of a method and a specific manner in which a processor and memory with computer program/algorithm are configured to cause that device 4A (or one or more components thereof) to operate. The various blocks shown in FIG. 5 may also be considered as a plurality of coupled logic circuit elements constructed to carry out the associated function(s), or specific result or function of strings of computer program code stored in a computer readable memory.

FIG. 7, described above, represents steps executed by a computer program or an implementing algorithm stored in the local memory of the access point 2, as well as illustrating the operation of a method and a specific manner in which a processor and memory with computer program/algorithm are configured to cause that access point 2 (or one or more components thereof) to operate. The various blocks shown in FIG. 7 may also be considered as a plurality of coupled logic circuit elements constructed to carry out the associated function(s), or specific result or function of strings of computer program code stored in a computer readable memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Reference is now made to FIG. 9 for illustrating a simplified block diagram of various electronic devices and apparatus that are suitable for use in practicing the exemplary embodiments of this invention. In particular embodiments, the access node 3 described in FIG. 9 is configured for communications according to the IEEE 802.11 standard, and preferably the IEEE 802.11ah standard. In other embodiments, the access node may be configured for communications according to other standards such as the IEEE 802.15.4 standard. The network access node 3 communicates over a wireless link to one or more mobile apparatus, such as mobile terminals or STA 5. The STA 5 corresponds to any one of communications devices 4A . . . 4D shown in FIG. 1. The network access node 3 corresponds to access point 3 shown in FIG. 1.

The STA 5 includes processing means such as at least one data processor (DP) 5A, storing means including a data buffer 5G and at least one computer-readable memory (MEM) 5B storing at least one computer program (PROG) 5C, and also communicating means such as a transmitter TX 5D and a receiver RX 5E for bidirectional wireless communications with the network access node 3 via one or more antennas 5F. The computer program 5C comprises a set of instructions that, when executed by the associated DP 5A, enable the STA to operate in accordance with the exemplary embodiments described with reference to FIGS. 3-6. In these regards the exemplary embodiments of this invention may be implemented at least in part by computer software stored on the MEM 5B, or by hardware, or by a combination of tangibly stored software and hardware (and tangibly stored firmware).

The network access node 3 similarly includes processing means such as at least one data processor (DP) 3A, storing means such as at least one computer-readable memory (MEM) 3B storing at least one computer program (PROG) 3C, and communicating means such as a transmitter TX 3D and a receiver RX 3E for bidirectional wireless communications with the STA 5 via one or more antennas 3F. The computer program 3C comprises a set of instructions that, when executed by the associated DP 3A, enable the network access node 3 to operate in accordance with the exemplary embodiments described with reference to FIGS. 7 and 8. In these regards the exemplary embodiments of this invention may be implemented at least in part by computer software stored on the MEM 3B, or by hardware, or by combination of tangibly stored software and hardware (and tangibly stored firmware).

Various embodiments of the computer readable MEMs 5B, 3B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 5A, 3A include but are not limited to general purpose computers, special purpose computers, microprocessors, digital signal processors (DSPs) and multi-core processors.

The above exemplary embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method comprising:
sending and receiving data, by a device in wireless communication with an access point, in a first mode;
receiving control data from the access point, by the device, the control data comprising first data indicative of a time period, and second data indicative of a control parameter comprising a contention value;
generating, by the device, a pseudo-random value;
comparing, by the device, the generated pseudo-random value to the contention value to determine a mode for the device;
placing at least some circuitry of the device used for sending data and at least some circuitry of the device used for receiving data in a low power state, by the device, in a second mode for the time period specified by the first data and on the basis of the control parameter, and storing data to be sent to the access point in a buffer accessible to the device; and
after expiry of the time period, sending, by the device in the first mode, the data stored in the buffer to the access point.

2. The method of claim 1, in which the generating and comparing are performed in dependence on the contention value being within a range of values of the pseudo-random number.

3. The method of claim 1, further comprising modifying the generated pseudo-random number based on at least one of:
an amount of data stored in the buffer;
a proportion of a total buffer size filled with data;
priority data associated with the data to be sent to the access point; and
energy available to the device.

4. The method of claim 1, in which the control data is received as a broadcast communication from the access point.

5. The method of claim 1, in which the control data is received as a multicast communication from the access point.

6. The method of claim 1, further comprising executing, by the device, a distributed coordination function having a back-off counter while in the first mode.

7. The method of claim 6, further comprising using the time period specified in the first data to configure a duration for the back-off counter when the device is in the second mode.

8. The method of claim 6, further, comprising resetting the back-off counter when the device transitions from the second mode to the first mode.

9. The method of claim 1, further comprising operating the device in accordance with the IEEE 802.11 standard or the IEEE 802.11ah standard.

10. An apparatus comprising:
at least one processor and at least one memory including a computer program code, wherein the at least one memory and the computer program code are configured to, with the at least one processor, cause the apparatus at least to:
in a first mode, send data to and receive data from, an access point with which the apparatus is in wireless communication;
receive control data from the access point, the control data comprising first data indicative of a time period, and second data indicative of a control parameter comprising a contention value;
generate a pseudo-random value;
compare the generated pseudo-random value to the contention value to determine a mode for the device;
place at least some circuitry of the device used for sending data and at least some circuitry of the device used for receiving data in a low power state, in a second mode, for the time period specified by the first data and on the basis of the control parameter, and store data to be sent to the access point in a buffer accessible to the apparatus; and after expiry of the time period, send the data stored in the buffer to the access point, in the first mode.

11. The apparatus of claim 10, wherein the at least one memory and the computer program code are configured to, with the at least one processor, cause the apparatus to perform the generating and comparing in dependence on the contention value being within a range of values of the pseudo-random number.

12. The apparatus of claim 10, wherein the at least one memory and the computer program code are configured to, with the at least one processor, cause the apparatus to execute a distributed coordination function having a back-off counter while in the first mode.

13. The apparatus of claim 12, wherein the at least one memory and the computer program code are configured to, with the at least one processor, cause the apparatus to use the time period specified in the first data to configure a duration for the back-off counter when the apparatus is in the second mode.

14. A computer program product comprising a non-transitory computer-readable storage medium having a set of computer readable instructions stored thereon, which, when executed by a computing system, cause the computing system at least to:

in a first mode, send data to and receive data from, an access point with which the apparatus is in wireless communication;

receive control data from the access point, the control data comprising first data indicative of a time period, and second data indicative of a control parameter comprising a contention value;

generate a pseudo-random value;

compare the generated pseudo-random value to the contention value to determine a mode for the device;

place at least some circuitry of the device used for sending data and at least some circuitry of the device used for receiving data in a low power state, in a second mode, for the time period specified by the first data and on the basis of the control parameter, and store data to be sent to the access point in a buffer accessible to the apparatus; and after expiry of the time period, send the data stored in the buffer to the access point, in the first mode.

15. The computer program product of claim 14, in which the generating and comparing are performed in dependence on the contention value being within a range of values of the pseudo-random number.

16. The computer program product of claim 14, wherein the computing system is further caused to execute a distributed coordination function having a back-off counter while in the first mode.

17. The computer program product of claim 16, wherein the computing system is further caused to use the time period specified in the first data to configure a duration for the back-off counter when the computing system is in the second mode.

* * * * *